INVENTOR
Leland E. Thompson
BY
Charles H. Brown
ATTORNEY

INVENTOR
Leland E. Thompson
BY
Charles H. Brown
ATTORNEY

Oct. 5, 1954 L. E. THOMPSON 2,691,065

MULTIPLEX RELAY SYSTEM

Filed Jan. 12, 1951 5 Sheets-Sheet 3

INVENTOR
Leland E. Thompson
BY
Charles H. Brown
ATTORNEY

Oct. 5, 1954 L. E. THOMPSON 2,691,065

MULTIPLEX RELAY SYSTEM

Filed Jan. 12, 1951 5 Sheets-Sheet 4

INVENTOR
Leland E. Thompson
BY
Charles H. Brown
ATTORNEY

INVENTOR
Leland E. Thompson
BY
Charles H. Brown
ATTORNEY

Patented Oct. 5, 1954 2,691,065

UNITED STATES PATENT OFFICE 2,691,065

MULTIPLEX RELAY SYSTEM

Leland E. Thompson, Merchantville, N. J., assignor to Radio Corporation of America, a corporation of Delaware Application January 12, 1951, Serial No. 205,685

8 Claims. (Cl. 179—15)

This invention relates to radio relay systems, and more particularly to a repeater station for a microwave radio relay communication system.

An object of this invention is to provide a novel radio repeater station for frequency modulation (FM) communication.

Another object is to devise a radio repeater station for multiplex communication, in which signal channels may be added or taken off at the repeater station without disturbing the "straight through" channels.

A further object is to devise a radio repeater station in which distortion of the signals being relayed is greatly reduced.

A still further object is to devise a radio repeater station in which means are provided to insure that a carrier is always transmitted from such repeater station despite the absence of an incoming signal; for example, as a result of a propagation or equipment failure.

The objects of this invention are accomplished, briefly, in the following manner: the relay station or repeater station of this invention is of the heterodyne type, in which the incoming signal is changed in frequency several times by heterodyne methods utilizing heterodyning oscillators. One of the heterodyning oscillators (sometimes referred to as a beating oscillator) is frequency modulated by the local signal which is desired to be added to the multiplex wave being amplified and retransmitted by the repeater. A percentage of the incoming multiplex wave is demodulated at the repeater, to enable taking off one or more signal channels thereat, the remaining percentage of the incoming wave passing through the repeater station without demodulation. A local standby oscillator is provided at the repeater station and this oscillator is turned on by circuitry responsive to the absence or cessation of an incoming signal, to thereby cause the transmission of a carrier wave from such repeater station. This arrangement enables the substantially continuous transmission of a carrier wave from the repeater station at all times. The carrier wave sent out by the repeater station as a result of the failure of an incoming signal to be received thereby is differently characterized from the carrier wave sent out by the repeater station in the presence of a received incoming signal. The differently-characterized carrier wave sent out by the repeater station in the absence of an incoming signal enables the operator to determine the location of the point at which the failure in the system has occurred.

A more detailed description of the invention follows, in conjunction with drawings, wherein.

Figure 1:
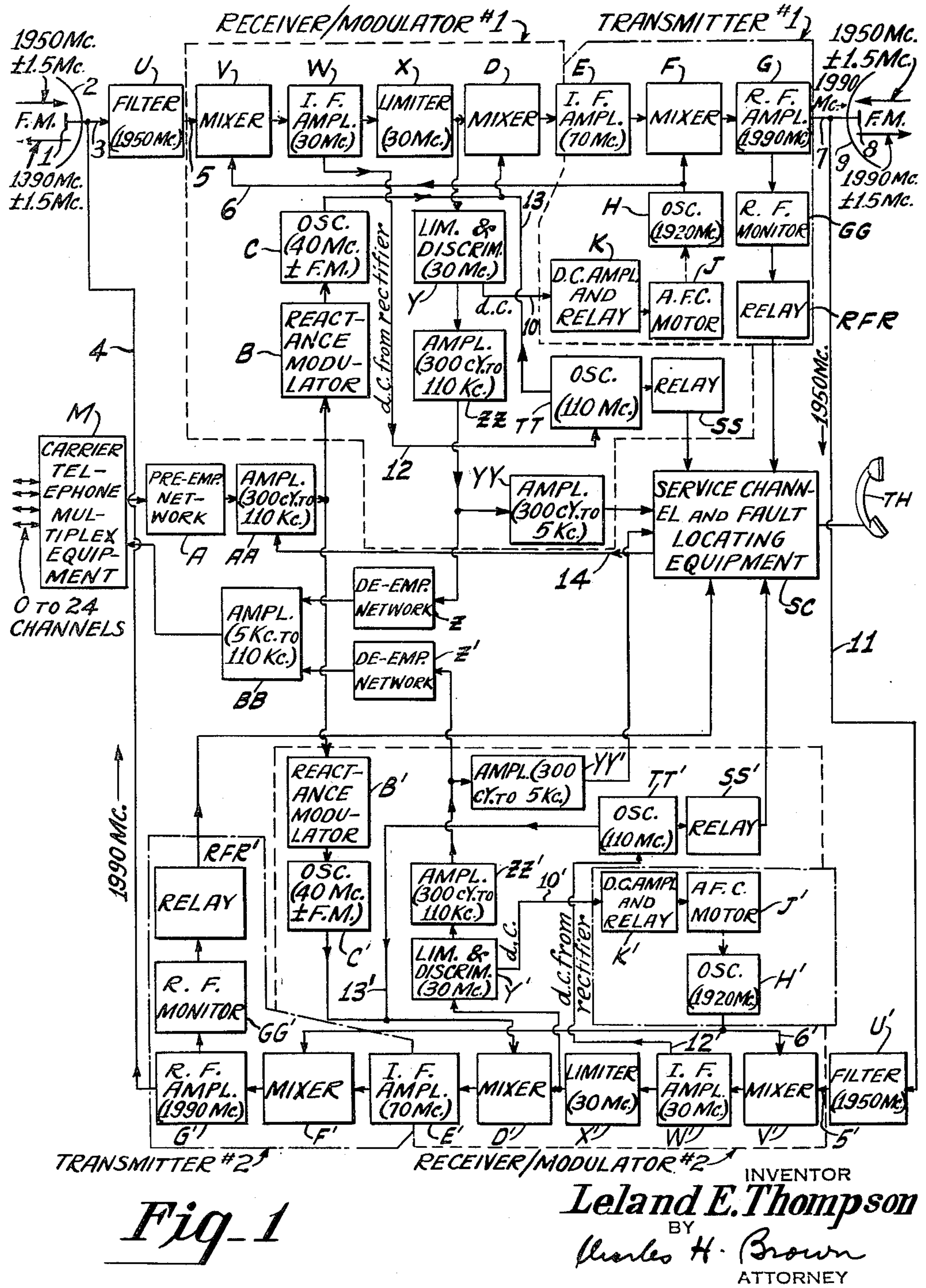
Fig. 1 is a block diagram of a repeater station according to this invention.
Figure 3:
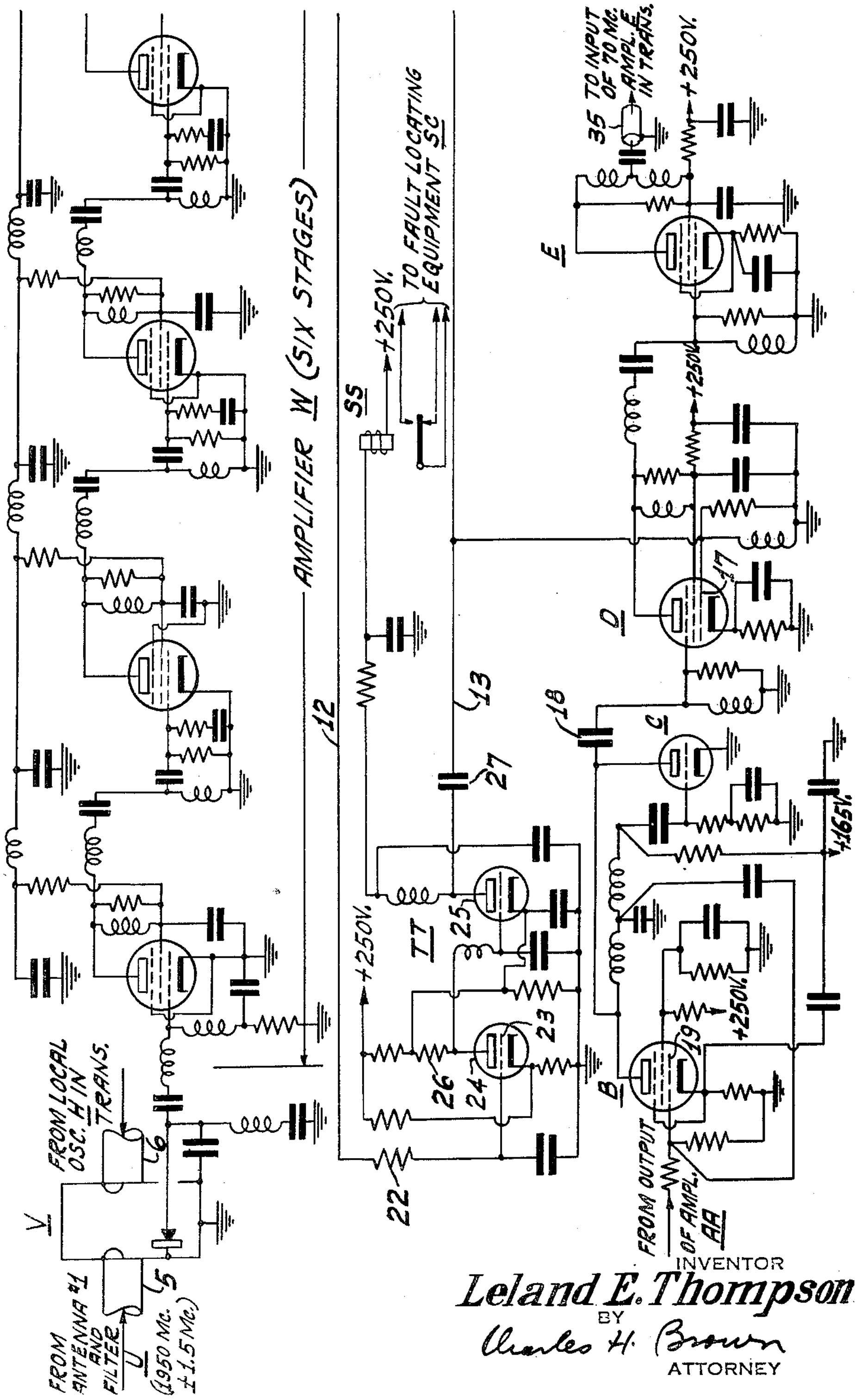
Figure 3A:
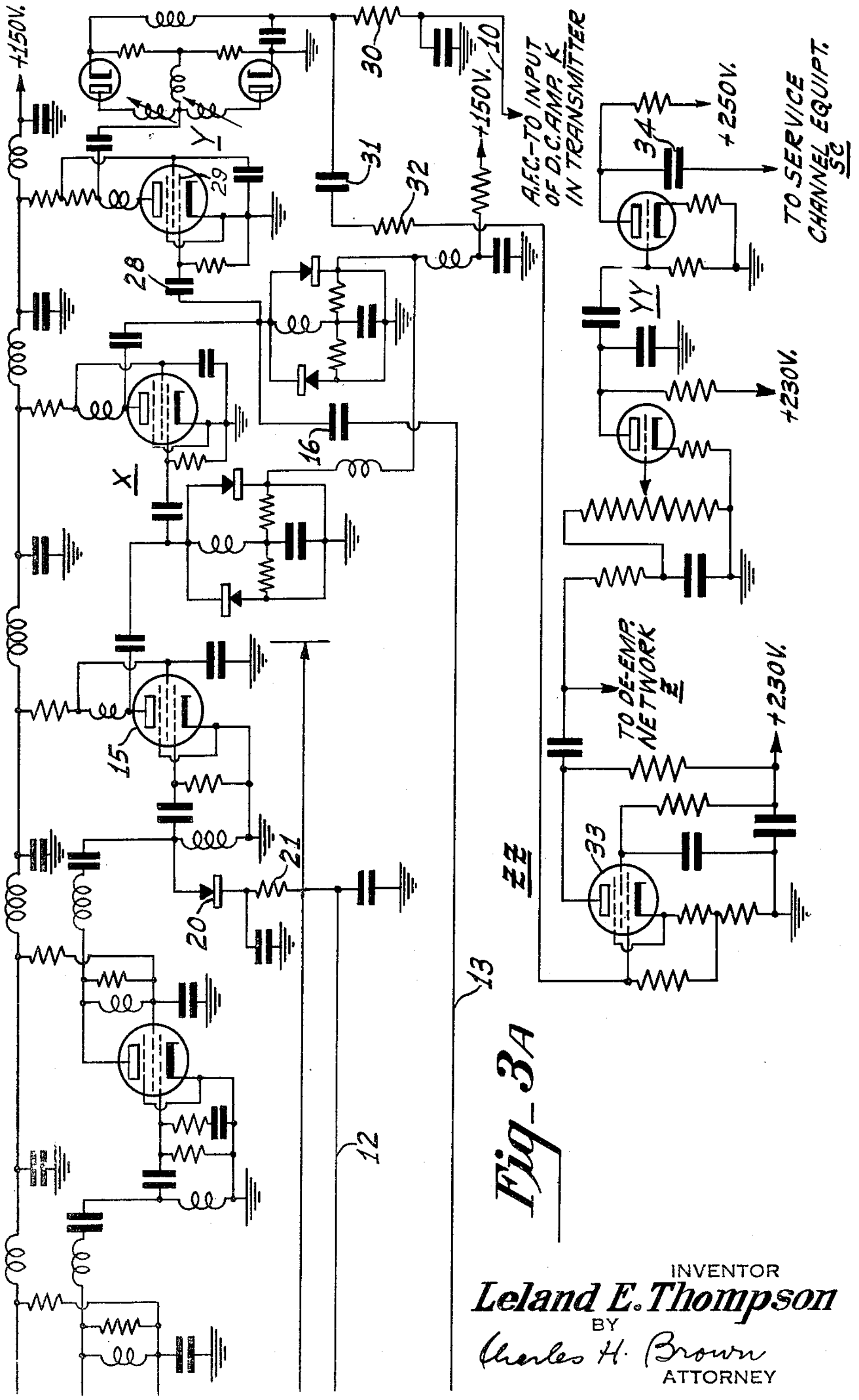
Figure 4:
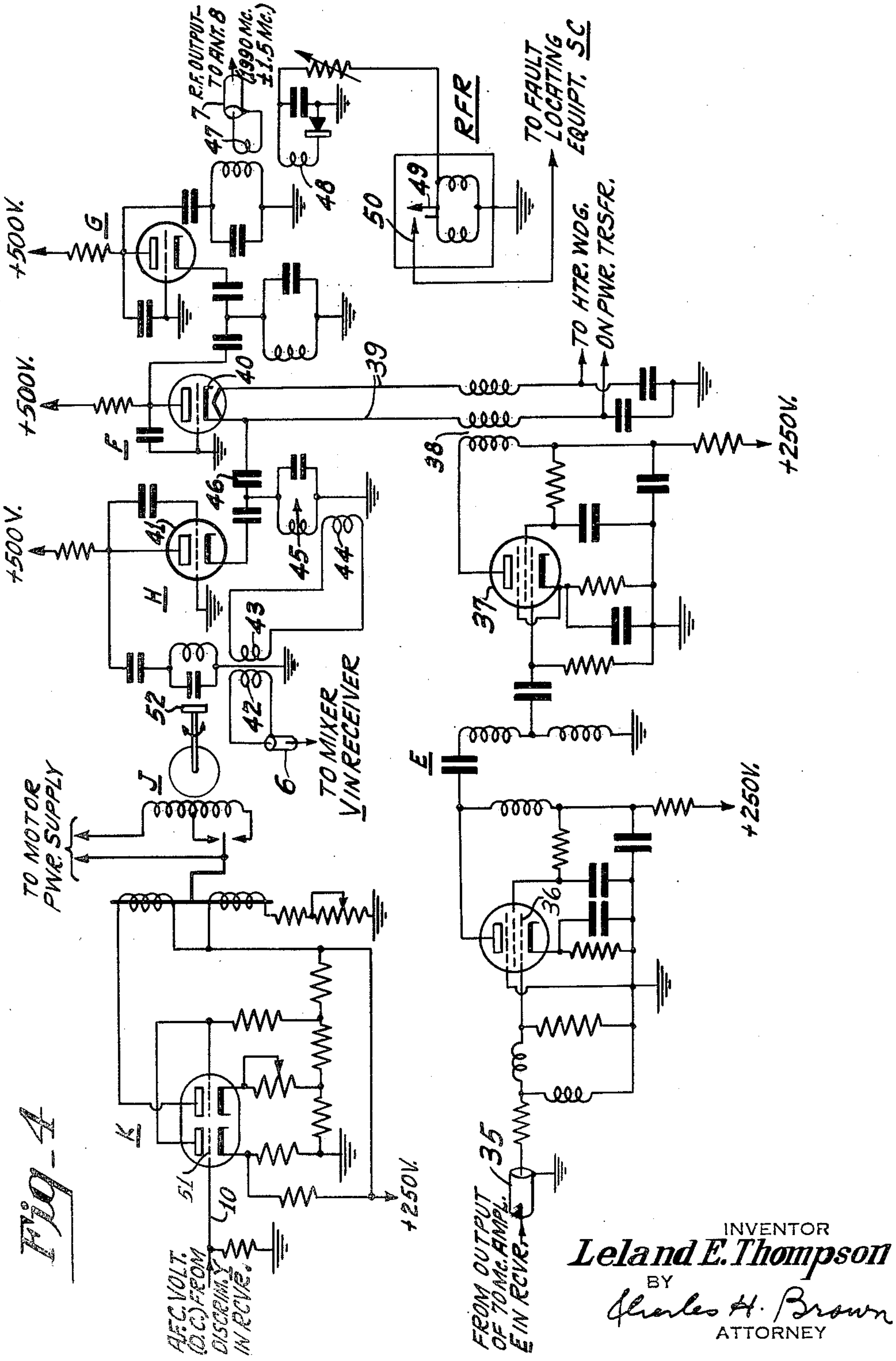

Figs. 3 and 3*a* are detailed circuit diagrams of a receiver/modulator unit of Fig. 1; and Fig. 4 is a detailed circuit diagram of a transmitter unit of Fig. 1.

In a microwave relay communication system of the type to which this invention relates, there are three basic equipment units, viz., multiplexing apparatus, terminal stations and repeater stations. The present invention is particularly concerned with the latter, the repeater stations. The general operation of a typical microwave relay communication system will now be described. At the terminal station, carrier telephone multiplex equipment is utilized to provide a multiplex signal, consisting of a plurality of signal channels, for example twenty-four in number, spaced from each other in the frequency spectrum. This multiplex signal is caused to frequency modulate a microwave transmitter, operating at a center frequency in the 1850–1990 megacycle band, for example at 1950 megacycles, with a maximum or peak frequency deviation of plus or minus 1.5 megacycles. Service channel and fault locating equipment is provided at the terminal station for maintenance communication and fault location. Also, this terminal station is provided with equipment to receive and demodulate for use, frequency modulated intelligence at a center frequency of 1990 megacycles. At a repeater station, the 1950-megacycle frequency-modulated signal is picked up, amplified and retransmitted as a frequency-modulated signal of the same peak deviation but at a slightly different center frequency, for example at 1990 megacycles. At the same time, multiplex equipment is provided if needed at the repeater station, and signal channels are taken off or added at such station without disturbing the "straight through" channels. If signal channels are added at the repeater station, the peak deviation of the signal sent out by the repeater will be different from the peak deviation of the incoming signal. Also, service channel and fault locating equipment is provided at the repeater station. Each repeater station transmits intelligence traveling in each of the two directions, a common antenna preferably being utilized for reception at 1950 megacycles from, and for transmission at 1990 megacycles to, the next succeeding terminal or repeater station in one azimuthal direction, and another common antenna preferably being utilized for reception at 1950 megacycles from, and for transmission at 1990 megacycles to, the next succeeding terminal or repeater station in the other azimuthal direction. If the repeater station described receives at 1950 megacycles and transmits at 1990 megacycles, the next repeater station (or terminal station) in the line would receive at 1990 megacycles and (if it is a repeater station) retransmit at 1950 megacycles. Of course, each terminal station would not receive and retransmit the same intelligence, but would demodulate and utilize all the received intelligence and would originate other intelligence for transmission in the same azimuthal direction from which the first-named intelligence is received.

A more detailed description of the preferred embodiment of this invention will now be given. Referring to the drawing and to Fig. 1 in particular, the repeater station shown is especially adapted for relaying a multichannel or multiplexed frequency-modulated wave such as emitted by the transmitting or terminal station disclosed in the copending Wheeler application, Serial No. 211,942, filed February 20, 1951, now Patent No. 2,653,315, dated September 22, 1953. Such a multichannel frequency-modulated wave is received upon antenna 1 provided with a parabolic reflector 2 in order to enhance directive reception. The received waves, which may have a mean frequency of 1950 megacycles, are fed through line 3 to a filter U which passes the frequency of 1950 megacycles. A line 4, the function of which will be described more in detail hereinafter, feeds frequency-modulated energy at a center frequency of 1990 megacycles to antenna 1 for directive transmission. The wave received on antenna 1, and therefore the output of filter U, may be, for example, a frequency-modulated wave having a mean frequency of 1950 megacycles and a maximum frequency deviation of plus and minus 1.5 megacycles. The filter U is sufficiently selective to prevent transmitter energy (in line 4) from entering the receiver/modulator #1.

The output of filter U is fed by line 5 to a mixer V which is one of the instrumentalities in receiver/modulator #1, the parts of which are surrounded by a dotted enclosure. In mixer V the received energy is combined or heterodyned with microwave energy from oscillator H in transmitter #1, fed by means of line 6. For example, oscillator H may have a frequency of 1920 megacycles, so that in mixer V there is produced, among other frequencies, a difference intermediate frequency (IF) of about 30 megacycles. This difference frequency signal is passed on to amplifier W, in which it is amplified, and then passed through a limiter X, in which it is limited. The output of limiter X is fed to a mixer D, in which it is combined with a 40-megacycle signal from oscillator C. The resulting sum frequency of 70 megacycles is selected and amplified in the IF amplifier E. The output of amplifier E is fed to a mixer F, in which it is combined with microwave frequency energy from the oscillator H previously referred to. The sum frequency of 1990 megacycles is selected from mixer F and amplified in a radio frequency (RF) amplifier G. The output of amplifier G is supplied by a line 7 to antenna 8 for transmission to the next repeater station or terminal station. Antenna 8 is provided with a parabolic reflector 9 in order to enhance directive transmission.

In prior systems, the channels to be amplified or "repeated" by the repeater station were ordinarily subjected to demodulation and remodulation processes at each repeater station. Such demodulation and remodulation necessarily introduced considerable distortion. According to this invention, the "straight through" channels are not subjected to any demodulation or remodulation whatever, such channels being merely heterodyned down, amplified and limited and then heterodyned back up for transmission. Therefore, distortion which would result from demodulation and remodulation is entirely eliminated by this invention.

Since energy from the same oscillator H is used in mixer V for heterodyning down the received signal and also in mixer F for heterodyning back up the signal to be transmitted and since the sum frequency is selected out of mixer F, the outgoing transmitted signal frequency does not depend on the frequency of oscillator H, and variations in the frequency of this oscillator do not cause frequency variations in the outgoing signal. In other words, the combinations of frequencies in the three heterodyning processes at V, D and F are such that the received signal is shifted upward only by the frequency of oscillator C and is not affected by the frequency of oscillator H. However, variations in the frequency of oscillator H do cause frequency variations in the 30-megacycle and 70-megacycle IF signals. It is necessary, from a practical engineering standpoint, to control the frequency of oscillator H, in order to maintain the IF signal in the center of the pass band of the amplifiers, or in other words, so that the IF derived from mixer V will be maintained at its proper value of 30 megacycles. This frequency control is accomplished by applying a portion of the output of limiter X to a limiter and discriminator Y which is centered at 30 megacycles and which provides a D. C. output in line 10, of a polarity and magnitude depending on the sense and amount of difference between the 30-megacycle center frequency and the frequency of the input to discriminator Y. The D. C. voltage in line 10 is amplified and used to operate a relay in the D. C. amplifier and relay unit K. An automatic frequency control (AFC) motor J is controlled by the relay in unit K and mechanically controls the frequency of oscillator H in a manner to be described more in detail hereinafter. In this way, the frequency of the injection or heterodyne oscillator H is maintained at the proper frequency to provide the desired 30-megacycle IF at the output of mixer V.

The repeater station of Fig. 1 is arranged to transmit in both directions simultaneously. For this purpose, a receiver/modulator #2 and a transmitter #2 are provided at such repeater station. In this second receiver/modulator and transmitter, units similar to those previously described are denoted by the same reference letters, but with a prime designation. Antenna 8 is also used for receiving a frequency modulated multiplex signal having a center frequency of 1950 megacycles and a maximum frequency deviation of plus and minus 1.5 megacycles. Line 11, coupled to antenna 8, feeds the waves received from this direction to a filter U′ which passes the frequency of 1950 megacycles. Filter U′ is sufficiently selective to prevent transmitter energy (in line 7) from entering receiver/modulator #2.

Filter U′ feeds energy by line 5′ to mixer V′, in which such energy is heterodyned to 30 megacycles by microwave energy from oscillator H'. The difference frequency signal of 30 megacycles is amplified in amplifier W' and limited in limiter X'. The output of limiter X' is fed to mixer D', in which it is combined with a 40-megacycle signal from oscillator C' to give a 70-megacycle signal which is amplified in amplifier E'. The output of amplifier E' is mixed in mixer F' with microwave frequency energy from oscillator H' to give a sum frequency of 1990 megacycles which is amplified in amplifier G'. The output of amplifier G' is supplied by line 4 to antenna 1 for directive transmission to the next repeater station or terminal station.

It will be noted that antennas 1 and 8 are directionally effective in different directions, antenna 1 being operative to receive from, and transmit to, the next repeater or terminal station in one azimuthal direction and antenna 8 being operative to receive from, and transmit to, the next repeater or terminal station in the other azimuthal direction.

In the example given, the signal is received by antenna 1 at 1950 megacycles and is transmitted by antenna 8 at 1990 megacycles. For transmission in the reverse direction, the signal is received by antenna 8 at 1950 megacycles and transmitted by antenna 1 at 1990 megacycles. In this way, for each of the two directions, the transmitted signal is shifted in frequency a small amount relative to the received signal, thus enabling the use of the same antenna for a single direction, without unwanted feedback.

At the next following repeater (or terminal) station in each direction, it will be required that signals be received on 1990 megacycles and transmitted on 1950 megacycles. This can be accomplished by suitable changes in the frequencies of oscillator H, filter U and amplifier G. For example, at the next succeeding station, filter U would pass 1990 megacycles received from the station in Figure 1 and oscillator H would have a frequency of 2020 megacycles, giving the required 30-megacycle IF in mixer V. In mixer F, the 2020 megacycles from oscillator H would beat with the 70 megacycles from amplifier E to give, among other frequencies, a difference frequency of 1950 megacycles which would be selectively amplified by amplifier G for transmission from this next station to a repeater station similar to that of Fig. 1. In the cases of both the Fig. 1 station and the next station, the combinations of frequencies in the three heterodyning processes at V, D and F are such that the received signal at each station is shifted either upward or downward only by the frequency of oscillator C and is not affected by the frequency of oscillator H.

Since the station of Fig. 1 transmits on a higher frequency than that on which it receives (transmitting on 1990 megacycles and receiving on 1950 megacycles), and since the next succeeding station transmits on a lower frequency than that on which it receives (transmitting on 1950 megacycles and receiving on 1990 megacycles), the direction of frequency deviation, with modulation, is reversed at successive repeater stations. This causes beneficial cancellation of second order nonlinearities.

According to this invention, means are provided for adding or taking off signal channels at the repeater without disturbing the "straight through" signals. In other words, communication is provided to and from repeater stations along the route of a communication system.

It will be noted that discriminator Y is connected to the output of limiter X and functions to demodulate the received multiplex frequency modulated signal appearing at the output of such limiter. For reception of the multiplexed signals at the repeater station, the demodulated signal output available from discriminator Y is passed through an amplifier ZZ to a de-emphasis network Z which reduces the amplitude of the higher frequency components. The output of network Z is passed through an amplifier BB to carrier telephone multiplex equipment M located at this station. Equipment M is of well-known type and is shown somewhat schematically in block diagram form in Fig. 2, to which reference will hereinafter be made.

Channels may be added to the outgoing signal carrier, at the repeater station, in either frequency or time spaces which are vacant on the incoming signal carrier. For this purpose, to permit transmission of intelligence from the station of Fig. 1 to other stations of the relay system, output from the multiplex equipment M is passed through a pre-emphasis network A which serves to emphasize the higher frequency components. The pre-emphasized signal is amplified in amplifier AA and applied to a reactance-type frequency modulator B which in turn modulates the frequency of the 40-megacycle oscillator C, previously referred to. Since the oscillator C is a heterodyne oscillator the output of which is mixed with the incoming signal in mixer D, any deviations in the frequency of oscillator C (produced, in turn, by locally-generated intelligence at the repeater station) are added to frequency deviations of the signal received at the repeater station and are transmitted by this station, the peak frequency deviation of the signal coming in to the repeater station plus the peak deviation added at the repeater station being plus and minus 1.5 megacycles. In this way, channels may be added to the outgoing signal carrier at the repeater station. Since another output of amplifier AA goes to modulator B', oscillator C' is also modulated by signal channels added on at the repeater station.

The signal modulation present on the incoming carrier goes straight through to the output (via units U, V, W, X, D, E, F and G) and is therefore not disturbed by the local discriminator Y (by which channels are taken off at the repeater station) or modulator B (by which channels are added at the repeater station).

Figure 2:
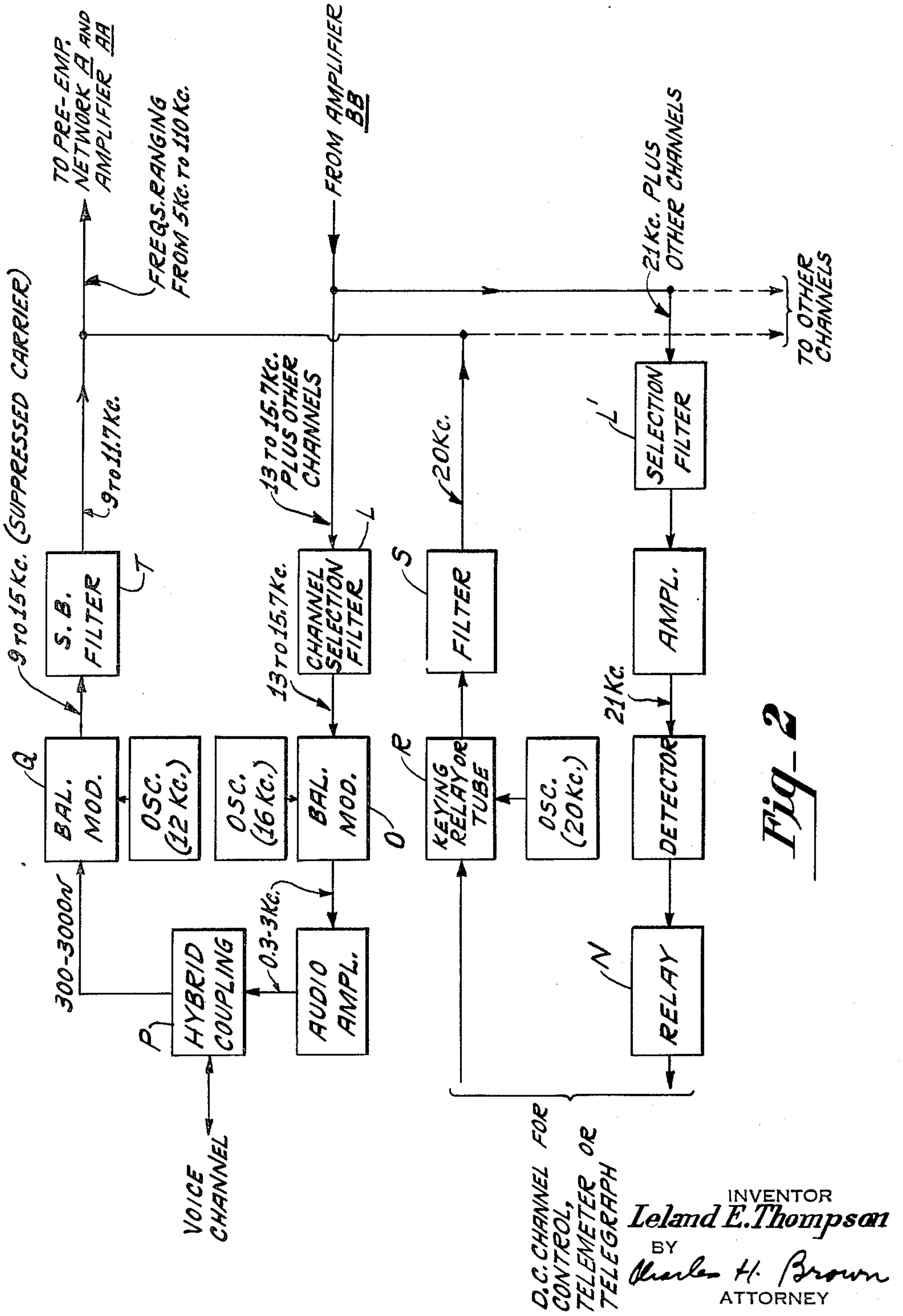
Fig. 2 is a block diagram of multiplex equipment which may be used in the station of Fig. 1.

As previously stated, Fig. 2 illustrates, in a somewhat schematic form, an arrangement which could be used for equipment M in Fig. 1. In Fig. 2, only two of the signal channels are represented, one being a voice channel and the other being a D. C. channel for control, telemeter or telegraph.

For reception at the repeater station, the output of amplifier BB in Fig. 1 goes in parallel to two channel selection filters L and L'. Filter L' selects the 21-kilocycle channel from the multiplex signal, the output of this filter being amplified, detected and used to energize a relay N which operates a suitable utilization device for the D. C. channel. Filter L selects the 13 to 15.7-kilocycle channel from the multiplex signal, the output of this filter being passed on to a balanced modulator O where it is beaten with 16-kilocycle energy from an oscillator to obtain a voice frequency band of 0.3 to 3 kilocycles which is amplified in an audio amplifier and passed on to suitable voice utilization equipment by way of a hybrid coupling P.

For addition of two multiplex channels at the repeater station, the voice utilization equipment applies a voice band of 300 to 3,000 cycles to a balanced modulator Q by way of coupling P. In modulator Q, this signal band is beaten with 12-kilocycle energy from an oscillator to obtain upper and lower sidebands extending from 9 to 15 kilocycles. A sideband filter T selects one of these sidebands, for example, the lower, from 9 to 11.7 kilocycles, and passes it on to pre-emphasis network A and amplifier AA. The D. C. channel signal is used to control a keying relay or tube R supplied with oscillatory energy of a suitable frequency, for example 20 kilocycles, from a local oscillator. A filter S passes the keyed 20-kilocycle output of device R and applies such output, in parallel with the output of filter T, to network A and amplifier AA.

Although only two channels have been illustrated in Fig. 2, it is pointed out that more than two channels may be utilized in the multiplex equipment if desired, as indicated by the dotted lines labeled "To other channels." To allow for these other channels, the output of the multiplex equipment in Fig. 2 may cover a band of frequencies extending from 5 kilocycles to 110 kilocycles, as indicated by the legend in Fig. 2.

Suitable circuits for the blocks of Fig. 2 are well-known to those skilled in the art, so further details of same are believed to be unnecessary.

In certain instances, a signal (1950 megacycles) might fail to be received at the repeater station. Such failure might be caused, for example, by failure of the transmitter at the preceding station or by abnormal propagation conditions. The transmitter of the repeater station as so far described will not radiate a signal (1990 megacycles as given in the example) unless a signal (1950 megacycles) is being received, since unless this is so, no 30-megacycle IF signal is produced in mixer V. It is necessary that carrier be transmitted in a system of this type even though the incoming signal is lost, so that the service channel and fault locating equipment can be used from each end of the system up to the break; if the carrier goes off, the noise on the system would prevent its use to locate the fault. Therefore, provision should be made for insuring the transmission of a carrier from the repeater station even though the incoming signal is lost. In order to accomplish this result, an oscillator TT, of 110-megacycle output frequency, is provided at the repeater station. Oscillator TT is biased off by a D. C. voltage appearing in a connection 12 which is taken from the output of a rectifier in amplifier W. Normally, there is a D. C. voltage in line 12 (there being such a D. C. output whenever there is a 30-megacycle signal in amplifier W), and this voltage is utilized to bias off the oscillator TT. The voltage developed in line 12 by noise alone in amplifier W is, however, insufficient to bias off oscillator TT.

Now, the absence or failure of a received 1950-megacycle signal will be indicated by no D. C. output in line 12, since under these conditions the 30-megacycle IF signal will no longer be present in amplifier W. The output of oscillator TT is fed to mixer D by means of a coupling 13, along with the output of oscillator C. When the D. C. from amplifier W disappears in connection 12, the bias is removed from oscillator TT and this oscillator becomes active. Oscillator TT then provides a 110-megacycle signal to mixer D, this signal in combination with the 40-megacycle signal from oscillator C (also coupled to such mixer) providing the necessary 70-megacycle signal for amplifier E. This signal is amplified in amplifier E and is changed by mixer F to the outgoing signal frequency of 1990 megacycles. In this way, a 1990-megacycle carrier is always transmitted from the repeater station, even though no incoming signal carrier is being received. Furthermore, this carrier may be modulated by applying a signal to the input of modulator B, so that such carrier may be modulated by a signal applied thereto at the repeater station, even though no incoming signal carrier is being received.

Similarly, a 110-megacycle oscillator TT' is provided for transmission in the other direction. The absence or failure of a received 1950-megacycle signal from the right-hand side of Fig. 1 causes oscillator TT' to be activated or turned on, supplying a 110-megacycle signal to mixer D' which, along with the 40 megacycles supplied from oscillator C', will produce a 70-megacycle signal for amplifier E'. This signal will be changed by mixer F' to the outgoing signal frequency of 1990 megacycles. In this manner, a 1990-megacycle carrier is always transmitted from the repeater station, even though no incoming signal carrier is being received from the right-hand side of Fig. 1. This carrier may be modulated by applying a signal to the input of modulator B'.

Service channel and fault locating equipment SC is provided at the repeater station. This equipment includes a telephone handset TH for maintenance communication and is also designed to transmit tone signals indicating faulty operation at the station. The mode of operation of this equipment will now be described. For the transmission of voice (maintenance) communication from handset TH and for the transmission of tone signals for fault location, the output connection 14 of equipment SC goes to an input of amplifier AA, wherein any signals coming out of said equipment are amplified, and such signals are then applied to modulator B to frequency modulate oscillator C. In this manner, any signals out of equipment SC are added to the signal going through the repeater station. Since another output of amplifier AA goes to modulator B', oscillator C' is also frequency modulated by signals out of equipment SC.

For reception of voice (maintenance) communication at the repeater station from one direction, a part of the output of amplifier ZZ (derived from discriminator Y, which demodulates the signal coming in from the left-hand side of Fig. 1) is amplified in an amplifier YY and furnished to equipment SC. Similarly, for reception of voice communication from the other direction, a part of the output of amplifier ZZ' (derived from discriminator Y', which demodulates the signal coming in from the right-hand side of Fig. 1) is amplified in an amplifier YY' and furnished to equipment SC.

A relay SS is connected to be energized by the output of oscillator TT. This relay is coupled to equipment SC in such a way that, when it is energized, emergency tone signals are transmitted by equipment SC to amplifier AA and thereby "put on the air" from the repeater station. At the time oscillator TT goes into operation (it will be remembered that this takes place in response to failure of the received signal at the repeater station), relay SS is operated, resulting in the transmission of emergency tone signals by unit SC from the repeater station by way of modulators B and B'.

Similarly, for transmission in the other direction, failure of the received signal at the repeater station causes oscillator TT' to go into operation, operating relay SS' and resulting in the transmission of emergency tone signals by unit SC from the repeater station by way of modulators B and B'.

A portion of the output of RF amplifier G is applied to an RF monitor GG which rectifies the radio frequency energy applied thereto, the rectified voltage being applied to a relay RFR. This rectified voltage is utilized to maintain relay RFR open as long as such voltage is present, this relay being closed or operated in response to the absence of such voltage. When the RF output of amplifier G fails due to a failure of the transmitter or the receiver/modulator, the rectified voltage out of monitor GG fails, closing relay RFR. This relay is connected to equipment SC in such a way as to turn on an audio tone in this equipment when the transmitted RF output from the repeater station fails. This audio tone fault locating station is applied to an input of amplifier AA through connection 14, thus applying such signal to both of the modulator units B and B' (one for each direction of transmission). Although this fault locating signal cannot, of course, be transmitted by the half of the repeater station which has failed (assumed in this example to be the #1 side), it is "put on the air" by transmitter #2 which transmits in the opposite direction.

Similarly, a portion of the output of RF amplifier G' is rectified by RF monitor GG' and applied to relay RFR' to keep it open. When the output of amplifier G' fails due to a failure of the transmitter or the receiver/modulator, relay RFR' is closed, causing an audio tone to be produced in equipment SC. This audio tone is applied to modulators B and B' through amplifier AA. This signal cannot be transmitted by the #2 side, of course, since it has failed, but it is transmitted by transmitter #1 which transmits in the other direction.

In some applications, standby equipment will be used at the repeater station, such equipment being controlled by relay RFR or relay RFR'. In this case the failure of a transmitter (or receiver/modulator) will cause the corresponding relay RFR or RFR' to operate. This relay operation would then function to transfer connections from the equipment which has failed to the standby equipment and to turn on the standby equipment, as well as to turn on the fault tone in the manner previously described. The service channel and fault locating equipment SC referred to herein is more fully described and claimed in the copending Wheeler et al. application, Serial No. 245,028, filed September 4, 1951.

Fig. 3 is a detailed circuit diagram of the receiver/modulator unit of this invention. Mixer V, which is supplied with oscillatory energy from oscillator H and with oscillatory energy from filter U (derived from antenna 1) by means of separate respective coaxial lines 6 and 5, is a crystal-type mixer the intermediate frequency energy output from which is taken from the crystal and supplied to the IF amplifier W through a suitable coupling arrangement including a condenser. The amplifier W is a high-gain six-stage tuned IF amplifier operating at 30 megacycles. The input and interstage couplings of this amplifier are as indicated in Fig. 3. Output from the final stage 15 of amplifier W is coupled to limiter stage X, in which limiting is accomplished by the utilization of biased rectifiers in the input circuit of the tube stage.

A portion of the output of limiter X is fed via a coupling condenser 16 to the control grid 17 of mixer D, to the suppressor grid of which the output of oscillator C is fed via a capacitor 18. Oscillator C is a frequency modulated oscillator which operates at a mean frequency of 40 megacycles, and is frequency modulated by means of a reactance tube B coupled thereto and having a modulating signal (the output of amplifier AA) applied to its control grid 19. The reactance modulator B and the oscillator C are more particularly disclosed and claimed in Mathwich Patent No. 2,659,867, dated November 17, 1953. The output of mixer D goes to the first stage of the 70-megacycle IF tuned amplifier E, the remaining stages of which are in the transmitter unit of Fig. 4.

A rectifier 20 is provided in the input circuit of the final amplifier stage 15, and the D. C. voltage developed across this rectifier (by the 30-megacycle signal passing through amplifier W) is fed via line 12 including a pair of series-connected resistors 21 and 22 to the control grid 23 of a control tube 24 in the oscillator unit TT. Normally (with 30-megacycle signal is amplifier W) this voltage fed via line 12 to grid 23 is positive and is sufficient to cause tube 24 to conduct. However, with noise only (that is, with no signal) passing through amplifier W, this voltage in line 12 is insufficient to cause tube 24 to conduct, and it is then biased off or nonconducting. The cathode of oscillator tube 25 is connected to one end of a resistor 26 which is in series in the plate circuit of tube 24, the grid of tube 25 being connected to the other end of this resistor. When tube 24 conducts (in response to a 30-megacycle signal in amplifier W) the current flowing through resistor 26 produces a voltage drop thereacross sufficient to bias off oscillator tube 25; at this time, the oscillator TT is disabled and does not produce any 110-megacycle signal. When tube 24 is rendered nonconducting (in response to the absence of a 30-megacycle signal in amplifier W), the voltage drop across resistor 26 disappears and oscillator tube 25 is no longer biased off; at this time, oscillator TT is rendered active and produces a 110-megacycle signal in its output.

The winding of relay SS is connected in the anode supply lead of oscillator tube 25, so that when oscillator TT is activated, relay SS is operated to complete a circuit to the fault locating equipment SC, thereby producing and transmitting from the relay station a fault locating tone signal, in the manner previously described.

The output line 13 of oscillator TT is coupled to the anode of tube 25 through a coupling condenser 27 and is also coupled to the control grid 17 of mixer D, so that when oscillator TT is rendered active a 110-megacycle signal is supplied therefrom to said mixer, there to beat with the 40-megacycle signal from oscillator C to produce a 70-megacycle IF signal.

Another portion of the output of limiter X is fed via a coupling condenser 28 to the control grid 29 of the limiter stage tube in a limiter and discriminator Y which operates at a center frequency of 30 megacycles. In this limiter stage, limiting is accomplished by biased rectifiers in the input or grid circuit of the tube, similarly to limiter X. From the output of the limiter stage in unit Y, the signal is fed to a discriminator of modified Conrad type including a pair of rectifiers. The D. C. voltage output from this discriminator is taken off via a resistor 30 in lead 10 for AFC purposes, being fed to the input of a D. C. amplifier K in the transmitter of Fig. 4.

The demodulated (intelligence frequency) output of discriminator Y is fed by way of a series-connected coupling condenser 31 and resistor 32 to the control grid of a tube 33 constituting amplifier ZZ. One part of the output of amplifier ZZ goes to de-emphasis network Z and amplifier BB, while the remaining part goes to the input circuit of two cascaded tubes constituting amplifier YY. Output from amplifier YY goes to the service channel equipment SC via a coupling condenser 34.

Fig. 4 is a detailed circuit diagram of the transmitter unit of this invention. The output of the single stage of IF amplifier E in the receiver of Fig. 3 is fed, by means of a suitable transmission line 35, to the control grid 36 of the first tube stage of two cascaded amplifier stages constituting the remainder of tuned IF amplifier E, which operates at 70 megacycles. The output of the final stage 37 of amplifier E is inductively coupled at 38 to a pair of heater leads 39 one of which is connected to the cathode 40 of a triode constituting mixer F. In this way, the 70-megacycle output of amplifier E is coupled to the cathode circuit of mixer stage F.

Oscillator H in the example given operates at 1920 megacycles and consists of a single triode 41 operating in a grounded-grid oscillatory circuit. A coil 42 inductively coupled to the resonant circuit of this oscillator feeds 1920-megacycle energy, by way of line 6, to mixer V of the receiver in Fig. 3.

Another coil 43 is inductively coupled to the resonant circuit of oscillator H for the purpose of feeding 1920-megacycle energy from such oscillator to mixer F, to there be mixed with 70-megacycle energy from amplifier E. For effecting this result, leads connected to coil 43 carry oscillatory energy to another coil 44 which is inductively coupled to a parallel LC circuit 45 one side of which is grounded and the other side of which is coupled to cathode 40 of mixer F by way of a condenser 46.

Mixer F consists of a single triode connected to operate as a grounded-grid mixer stage. The output of mixer F goes to RF amplifier G, which consists of a single triode connected to operate as a tuned grounded-grid amplifier stage. Amplifier G is tuned to operate at 1990 megacycles. A coil 47, inductively coupled to the tuned output circuit of amplifier G, enables RF output, frequency modulated, energy of 1990 megacycles to be fed, by means of transmission line 7, to antenna 8.

A coil 48 is also inductively coupled to the tuned output circuit of amplifier G, for feeding RF energy to the RF monitor GG. Monitor GG includes a rectifier in which the applied RF energy is rectified, the rectified voltage then being applied to a relay RFR through a series resistor. Generally, relay RFR may consist of a current meter the moving element of which carries a movable contact 49 which engages a fixed contact 50 when rectified current no longer flows through such meter (in the absence of RF energy output from amplifier G). When contact 49 engages contact 50, a suitable circuit is completed to fault locating equipment SC for the transmission of a suitable tone indicating a fault.

The D. C. output voltage of discriminator Y appears in line 10 and is applied to the control grid 51 of the first stage of a two-stage direct-coupled D. C. amplifier K. The output of this amplifier is applied to a relay which energizes, with one relative polarity or the other, a reversible AFC motor J. A metal plate 52 is attached to the shaft of motor J and is inductively related to the resonant or tuned circuit of oscillator H. Rotation of the shaft of motor J, in response to energization of the motor by its controlling relay, causes movement of plate 52, thereby varying the inductance of the tuned circuit of oscillator H and, as a result, varying the frequency of oscillator H. In this way, the output frequency of oscillator H is automatically maintained at a value such as to provide a beat frequency of exactly 30 megacycles in the output of mixer V.

What I claim to be my invention is:

1. Relaying apparatus comprising means for receiving a signal modulated wave, a source of heterodyning energy, means for heterodyning the received wave with energy from said source to produce an intermediate frequency wave, a heterodyne oscillator, means for frequency modulating said oscillator in accordance with a signal to be added to the wave being relayed, thereby increasing the frequency deviation of the received signal modulated wave passing through said relaying apparatus, a mixer for heterodyning said intermediate frequency wave with the modulated output of said oscillator, means for heterodyning the wave derived from said mixer with energy from said source to produce an altered frequency wave, and means for transmitting said altered frequency wave.

2. Relaying apparatus comprising means for receiving a signal modulated wave transmitted from a remote point, a source of heterodyning energy, means for heterodyning the received wave with energy from said source to produce an intermediate frequency wave, a mixer for heterodyning said intermediate frequency wave with a locally-generated, signal modulated wave to produce a beat frequency wave having a predetermined mean frequency, means for rectifying said intermediate frequency wave, an oscillator for supplying to said mixer wave energy of a frequency which, when mixed with said locally-generated, signal modulated wave in said mixer, will produce a beat frequency wave of said predetermined mean frequency, means responsive to the rectified wave for biasing said oscillator to cutoff and responsive to the absence of said rectified wave for removing said cutoff bias, means for heterodyning the output of said mixer with energy from said source to produce an altered frequency wave, and means for transmitting said altered frequency wave to a remote point.

3. Relaying apparatus comprising means for receiving a signal modulated wave transmitted from a remote point, a source of heterodyning energy, means for heterodyning the received wave with energy from said source to produce an intermediate frequency wave, a mixer for heterodyning said intermediate frequency wave with a locally-generated, signal modulated wave to produce a beat frequency wave having a predetermined mean frequency, a controllable oscillator having a frequency which, when mixed with said locally-generated, signal modulated wave in said mixer, will produce a beat frequency wave of said predetermined mean frequency, means responsive to said intermediate frequency wave for controlling said oscillator to automatically activate the same in response to the absence of such wave, means for heterodyning the output of said mixer with energy from said source to produce an altered frequency wave, and means for transmitting said altered frequency wave to a remote point.

4. Relaying apparatus comprising means for receiving a frequency modulated wave transmitted from a remote point, a source of heterodyning energy, means for heterodyning down the received wave with energy from said source to produce an intermediate frequency wave, a mixer for heterodyning said intermediate frequency wave with a locally-generated, frequency modulated wave to produce a beat frequency wave having a predetermined mean frequency, a controllable oscillator having a frequency which, when mixed with said locally-generated, frequency modulated wave in said mixer, will produce a beat frequency wave of said predetermined mean frequency, means responsive to said intermediate frequency wave for controlling said oscillator to automatically activate the same in response to the absence of such wave, means for heterodyning up the output of said mixer with energy from said source to produce a higher frequency wave, and means for transmitting said higher frequency wave to a remote point.

5. Relaying apparatus comprising means for receiving a wave transmitted from a remote point, means for mixing the received wave with a locally-generated wave to produce an intermediate frequency wave, another mixing means, a source of locally-generated waves, means operating in response to the absence of said intermediate frequency wave for supplying to said other mixing means wave energy of a frequency which, when mixed with waves from said source in said other mixing means, will produce a beat frequency wave of predetermined frequency, means operating in response to the supplying of said wave energy to said other mixing means for coupling fault tone signals into said other mixing means, and means coupled to said other mixing means for transmitting output therefrom to a remote point.

6. Relaying apparatus comprising means for receiving a signal modulated wave transmitted from a remote point, a source of heterodyning energy, means for heterodyning the received wave with energy from said source to produce an intermediate frequency wave, a mixer for heterodyning said intermediate frequency wave with a locally-generated, signal modulated wave to produce a beat frequency wave having a predetermined mean frequency, a controllable oscillator having a frequency which, when mixed with said locally-generated, signal modulated wave in said mixer, will produce a beat frequency wave of said predetermined mean frequency, means responsive to said intermediate frequency wave for controlling said oscillator to automatically activate the same in response to the absence of such wave, means operating in response to the activation of said oscillator for modulating said locally-generated wave with fault tone modulation signals, means for heterodyning the output of said mixer with energy from said source to produce an altered frequency wave, and means for transmitting said altered frequency wave to a remote point.

7. Relaying apparatus comprising means for receiving a frequency modulated wave, a source of heterodyning energy, means for heterodyning down the received wave with energy from said source to produce an intermediate frequency wave, a heterodyne oscillator, means for frequency modulating said oscillator with a signal to be added to the wave being relayed, a mixer for heterodyning said intermediate frequency wave with the frequency modulated output of said oscillator to produce a beat frequency wave of predetermined mean frequency, an oscillator for supplying to said mixer wave energy of a frequency which, when mixed with the output of said heterodyne oscillator in said mixer, will produce a beat frequency wave of said predetermined mean frequency, means responsive to the presence of said intermediate frequency wave for biasing said oscillator to cutoff and responsive to the absence of said intermediate frequency wave for removing said cutoff bias, means for heterodyning up the wave derived from said mixer with energy from said source to produce a higher frequency wave, and means for transmitting said higher frequency wave.

8. Relaying apparatus comprising means for receiving a frequency modulated wave, a source of heterodyning energy, means for heterodyning down the received wave with energy from said source to produce an intermediate frequency wave, means receptive of said intermediate frequency wave for demodulating the same to derive intelligence signals therefrom, means for utilizing such intelligence signals, a heterodyne oscillator, means for frequency modulating said oscillator with a signal to be added to the wave being relayed, a mixer for heterodyning said intermediate frequency with the frequency modulated output of said oscillator, means for heterodyning up the wave derived from said mixer with energy from said source to produce a higher frequency wave, and means for transmitting said higher frequency wave.

References Cited in the file of this patent

UNITED STATES PATENTS

| Number | Name | Date |
|---|---|---|
| 2,296,384 | Hansell | Sept. 22, 1942 |
| 2,407,213 | Tunick | Sept. 3, 1946 |
| 2,477,570 | Berg | Aug. 2, 1949 |